United States Patent
Ferren et al.

(10) Patent No.: US 10,372,169 B1
(45) Date of Patent: Aug. 6, 2019

(54) CASE FOR PORTABLE ELECTRONIC COMPUTING DEVICE WITH STAND

(71) Applicant: Pioneer Square Brands, Inc., Seattle, WA (US)

(72) Inventors: Michael Cooper Ferren, Camas, WA (US); Michael Heecheol Kim, Seattle, WA (US); Jaimie Emerald Chan, Renton, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

(21) Appl. No.: 16/285,168

(22) Filed: Feb. 25, 2019

(51) Int. Cl.
 *G06F 1/16* (2006.01)

(52) U.S. Cl.
 CPC .......... *G06F 1/166* (2013.01); *G06F 1/1615* (2013.01); *G06F 1/1628* (2013.01); *G06F 1/1654* (2013.01)

(58) Field of Classification Search
 CPC ....... G06F 1/1601; G06F 1/1628; G06F 1/166
 USPC .................................................. 361/679.59
 See application file for complete search history.

(56) References Cited

U.S. PATENT DOCUMENTS

| | | | |
|---|---|---|---|
| 9,795,213 B1* | 10/2017 | Vier | G06F 3/0231 |
| 2005/0052831 A1* | 3/2005 | Chen | G06F 1/1616 361/679.11 |
| 2012/0314354 A1* | 12/2012 | Rayner | H01H 13/06 361/679.01 |
| 2013/0235522 A1* | 9/2013 | Chiou | G06F 1/1628 361/679.56 |
| 2014/0376179 A1* | 12/2014 | Jenkins | G06F 1/166 361/679.55 |
| 2016/0088750 A1* | 3/2016 | Wu | F16M 11/10 |
| 2016/0216742 A1* | 7/2016 | Lee | F16M 11/38 |
| 2016/0309010 A1* | 10/2016 | Carnevali | H04B 1/3888 |
| 2017/0168524 A1* | 6/2017 | Kim | G06F 1/1626 |
| 2018/0239399 A1* | 8/2018 | Nakada | G06F 1/166 |
| 2019/0107695 A1* | 4/2019 | Chen | G06F 1/16 |

* cited by examiner

*Primary Examiner* — Anthony Q Edwards
(74) *Attorney, Agent, or Firm* — Grandview Law

(57) ABSTRACT

Systems and methods are involved with but are not limited to an apparatus including an inner case portion including including a first stand aperture; and an outer case portion couplable with the inner case portion, the outer case portion including a second stand aperture positioned to align with the first stand aperture of the inner case portion to provide a common aperture. In addition, other aspects are described in the claims, drawings, and text forming a part of the present disclosure.

20 Claims, 8 Drawing Sheets

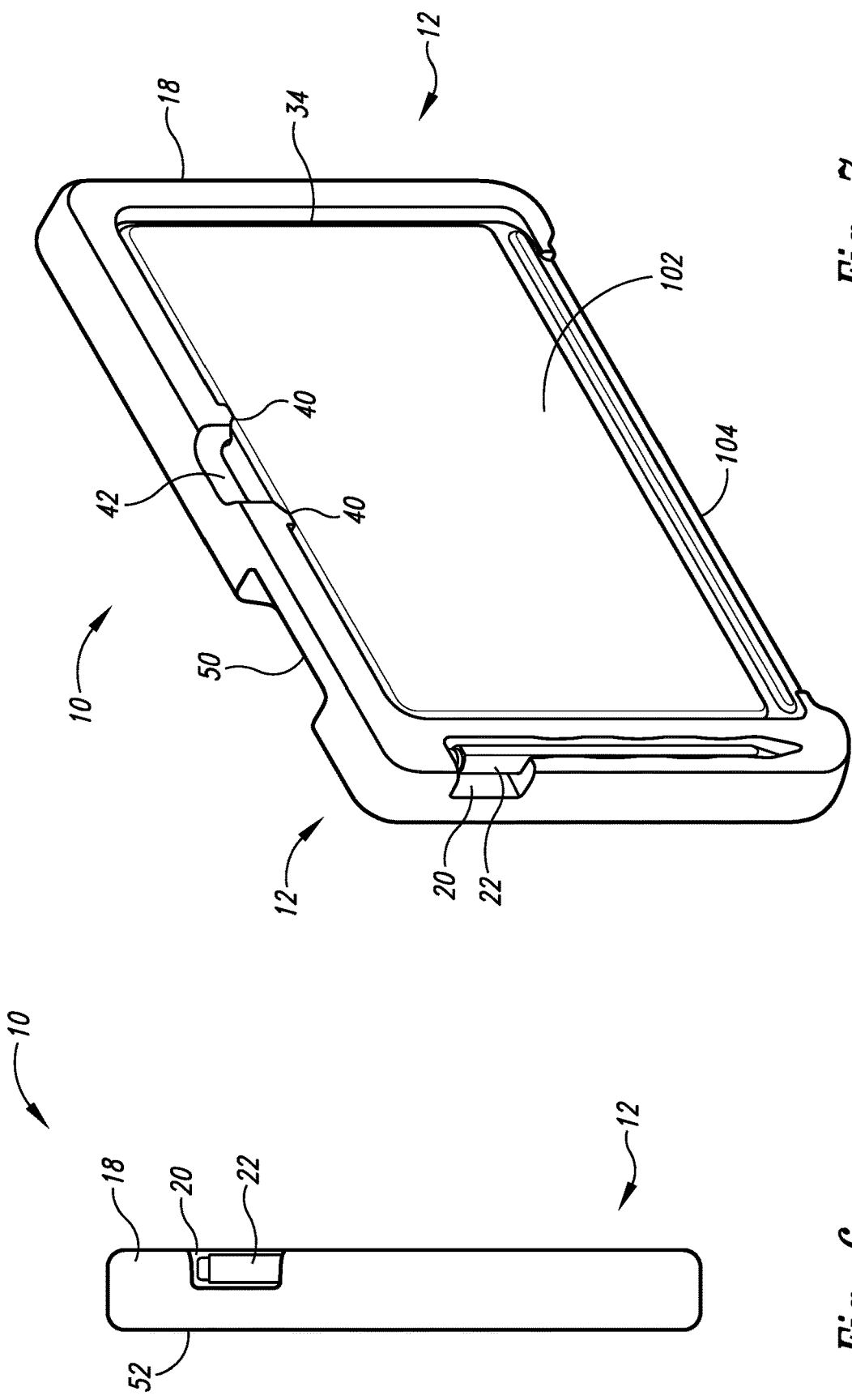

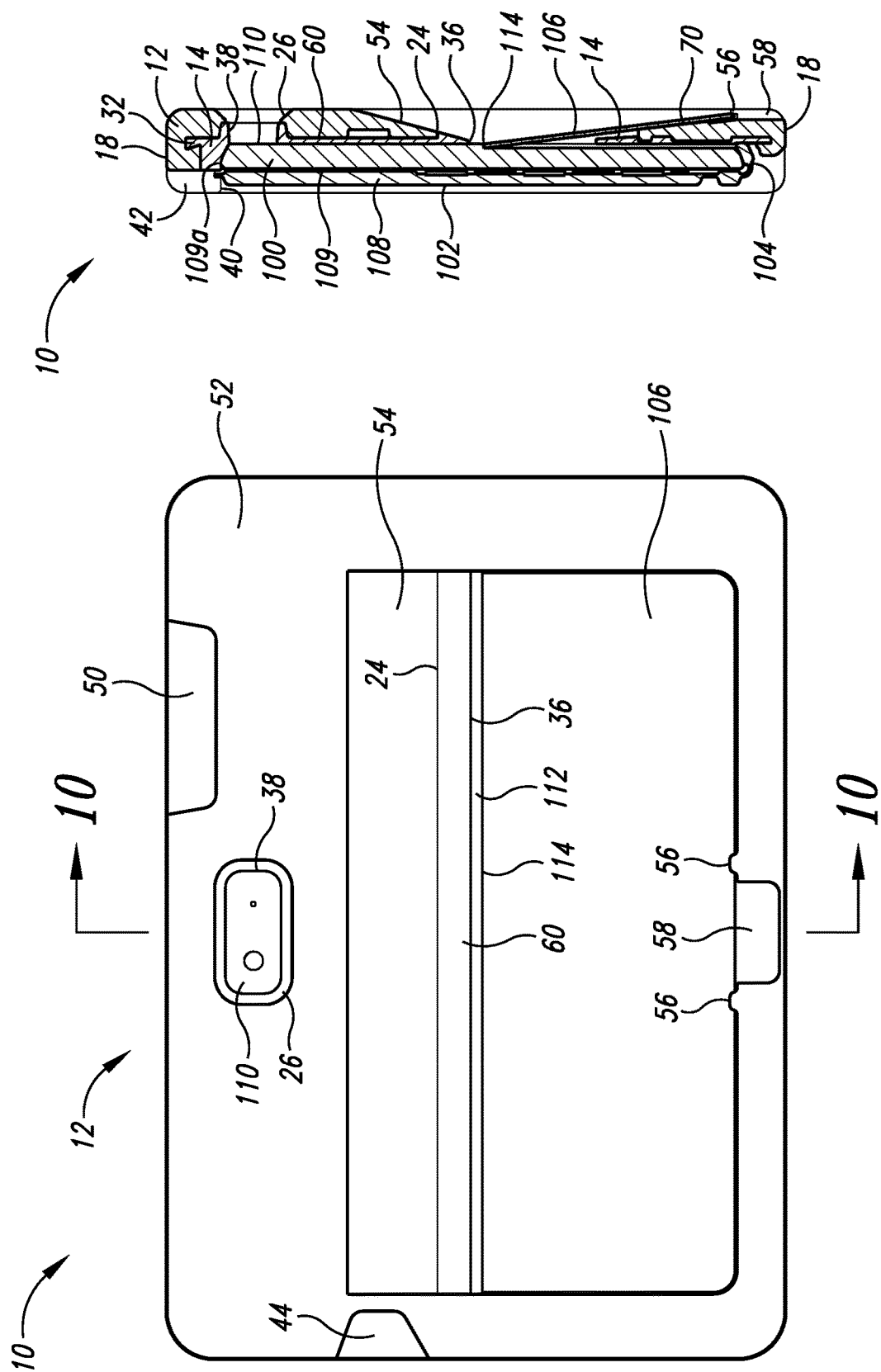

US 10,372,169 B1

CASE FOR PORTABLE ELECTRONIC COMPUTING DEVICE WITH STAND

SUMMARY

In one or more aspects, an apparatus includes, but is not limited to a case including an inner case portion including a first stand aperture; and an outer case portion couplable with the inner case portion, the outer case portion including a second stand aperture positioned to align with the first stand aperture of the inner case portion to provide a common aperture. In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise.

With reference now to the figures, shown are one or more examples of case for portable electronic computing case based articles of manufacture, compositions of matter, systems for producing and/or methods for producing same that may provide context, for instance, in introducing one or more processes and/or devices described herein.

FIG. 6 is a side-elevational view of the case for portable electronic computer device embodiment of FIG. 1.

FIG. 7 is a front perspective view of the case for portable electronic computing device embodiment of FIG. 1 showing an exemplary portable electronic computing device as housed therein.

FIG. 9 is a rear-elevational view of the case for portable electronic computing device embodiment of FIG. 1 showing an exemplary portable electronic computing device as housed therein.

FIG. 10 is a side-elevational cross-sectional view of the case for portable electronic computing device embodiment of FIG. 1 taken along the cut lines 10-10 of FIG. 9.

DETAILED DESCRIPTION

Figure 1:
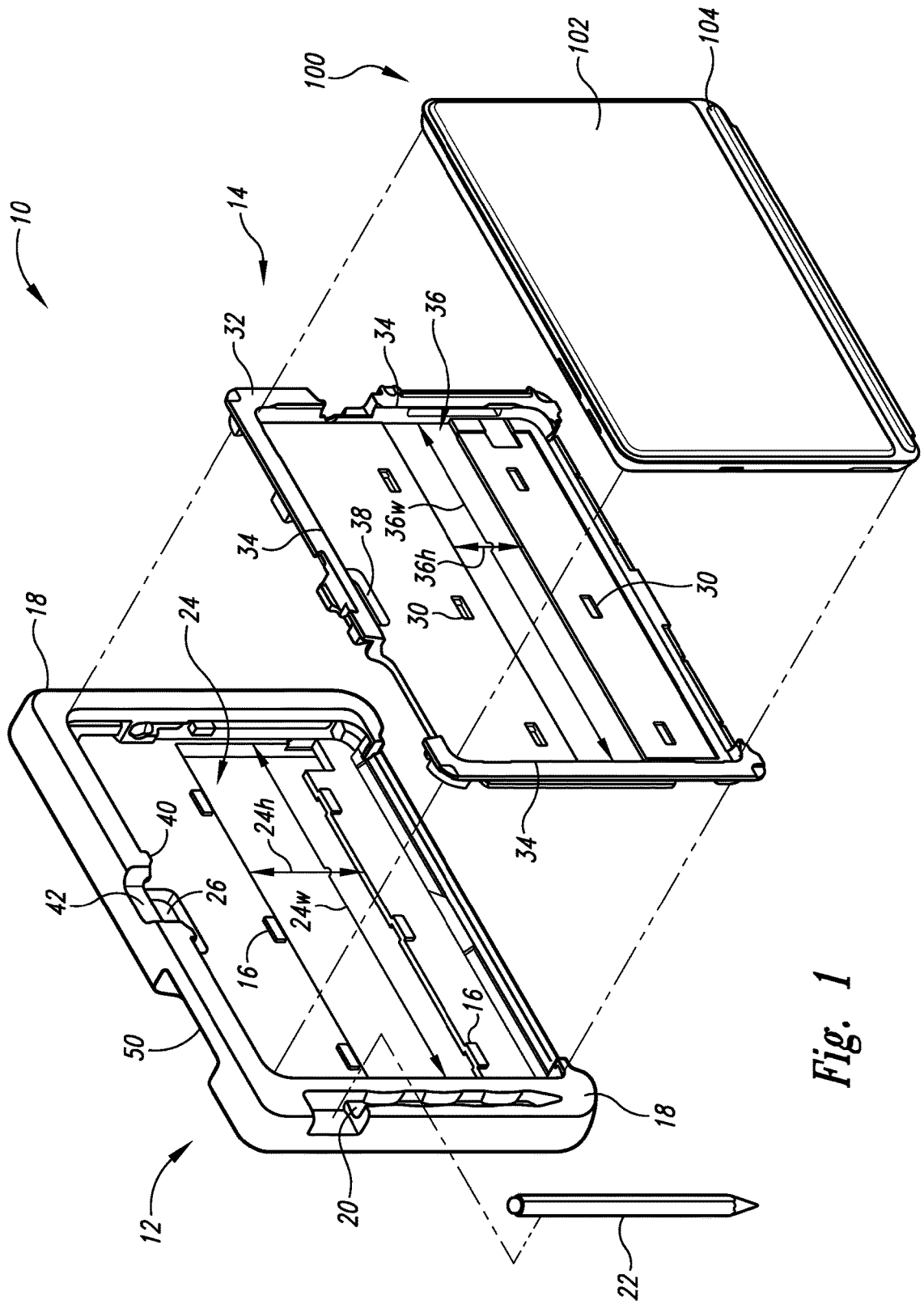
FIG. 1 is a front perspective exploded view of a case for portable electronic computing case embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Portable electronic devices, such as laptop-shaped electronic computing devices having stands integrated therein, along with their conventional cases, can pose challenges in ease of use for containment by such cases.

Turning to FIG. 1, shown in front exploded perspective view is a first embodiment of device case 10 depicted to include a first case portion known as outer case portion 12 and a second case portion known as inner case portion 14. Outer case portion 12 and inner case portion 14 couple with each other to form device case 10.

Outer case portion 12 is depicted as a rectangularly shaped tray including back portion 15, tabs 16, side rim 17, periphery 18, stylus holder 20, exemplary stylus 22, stand aperture 24 with height 24$h$ and width 24$w$, and camera aperture 26. Back portion 15 includes tabs 16, which are used to couple, in part, with inner case portion 14 as further described below. Side rim 17 with its sides extends from back portion 15. Periphery 18 is generally of a shock aborbant material to allow for a cushioning effect for accidental impacts and also to provide grip surfaces for device case 10. Outer case portion includes stylus holder 20, which is generally a channel sized and shaped to contain a stylus such as exemplary stylus 22. Stand aperture 24, having height 24$h$ and width 24$w$, is so positioned, sized, and shaped in back portion 15 to accommodate a device stand as further described and shown below. Camera aperture 26 is so positioned, sized, and shaped to accommodate a device camera as further described and shown below.

Further regarding FIG. 1, inner case portion 14 is depicted as a rectangularly shaped tray including back portion 29, slots 30, side rim 31, periphery 32, inner lip 34, stand aperture 36, and camera aperture 38. Back portion 29 includes slots 30 are positioned, shaped, and sized to individually align and engage with tabs 16 as integrated fasteners to assist through a snap lock fit with coupling outer case portion 12 with inner case portion 14. Side rim 31 with its sides extends from back portion 29. Periphery 32 is shaped and sized to engage with various recesses of outer case portion 12 to further assist with engagement of outer case portion 12 and inner case portion 14. Inner lip 34 is sized, shaped, and positioned for engagement, in part, of inner case portion 14 with a device to be contained by device case 10. Stand aperture 36, having height 36$h$ and width 36$w$, is so positioned, sized, and shaped to accommodate a device stand as further described and shown below. Camera aperture 38 is so positioned, sized, and shaped to accommodate a device camera as further described and shown below.

As shown, inner case portion 14 is shaped and sized to contain an exemplary tablet or laptop-shaped computing device 100 with keyboard back 102. As depicted, exemplary device 100 can be a tablet with a detachable keyboard or a laptop-shaped computing device with an integrated keyboard with both versions having an extended stand as described further below.

Figure 2:
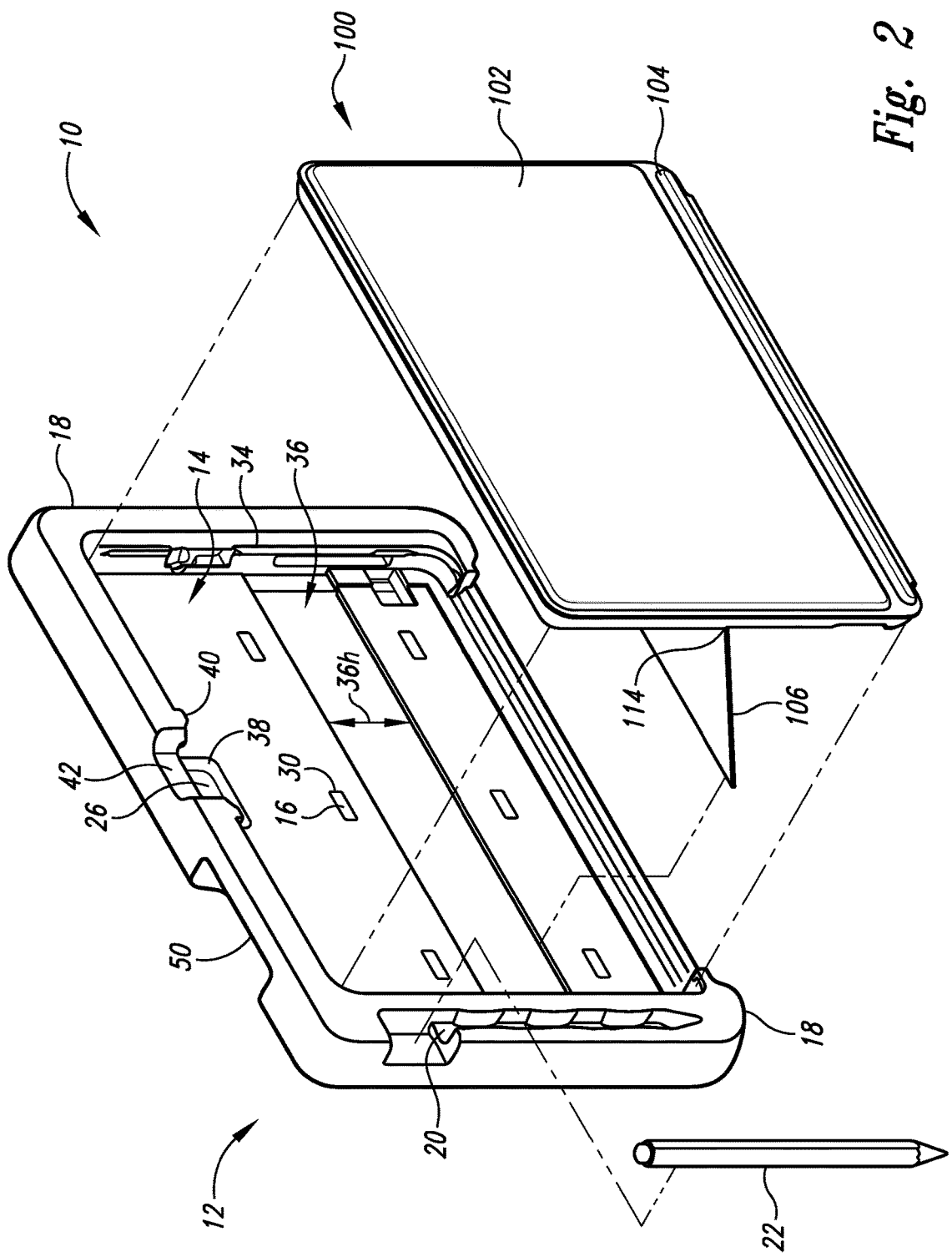
FIG. 2 is a front perspective exploded view of the case for portable electronic computing case embodiment of FIG. 1.

Turning to FIG. 2, shown in front perspective view is outer case portion 12 coupled with inner case portion 14 of device case 10 ready to contain exemplary device 100 with stand 106 being extended therefrom. Both stand aperture 24, having height 24$h$ and width 24$w$, and stand aperture 36, having height 36$h$ and width 36$w$, are so positioned, sized, and shaped to align with one another to provide a common aperture as shown to accommodate passage of stand 106 therethrough.

Figure 3:
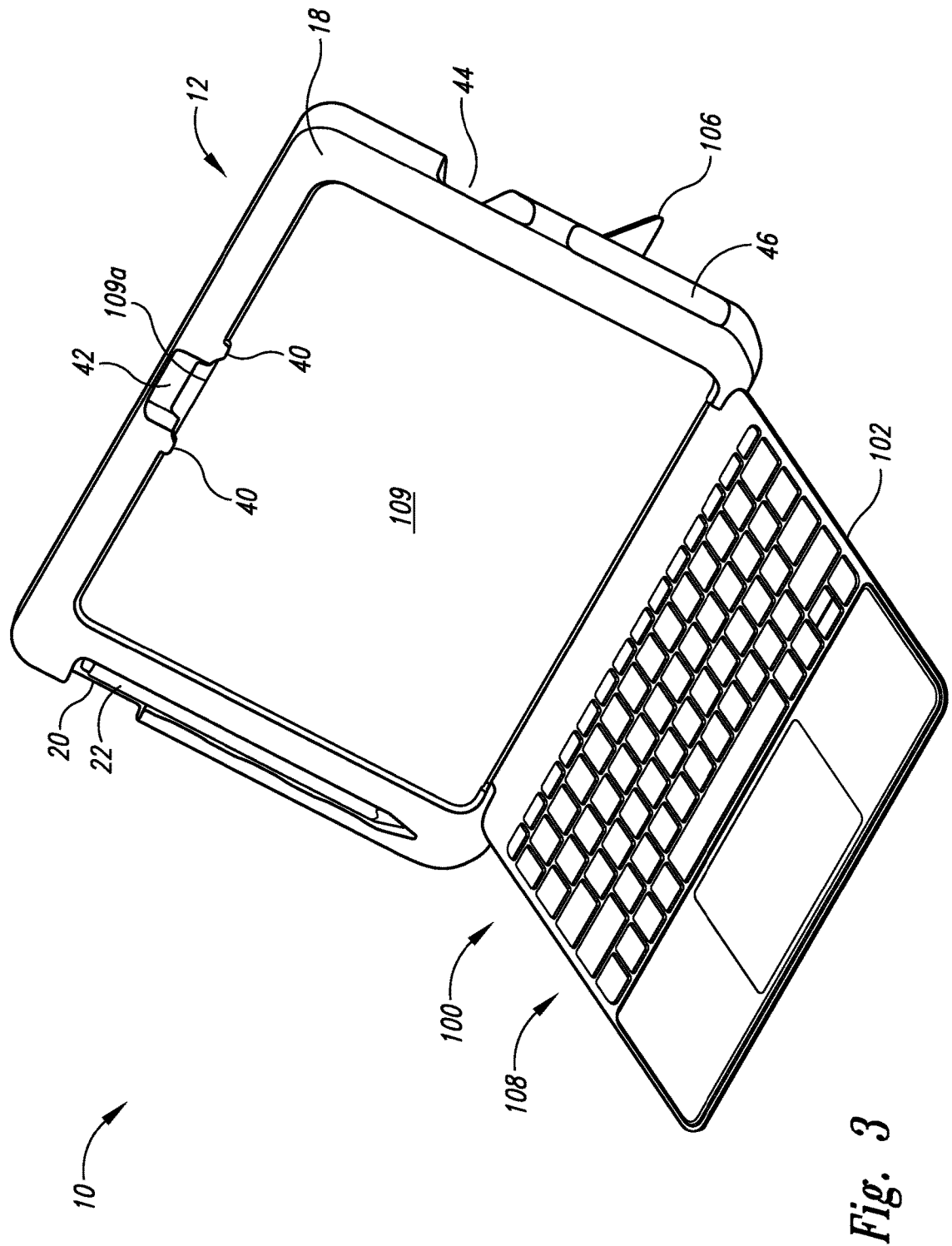
FIG. 3 is a front perspective view of the case for portable electronic computing device embodiment of FIG. 1 showing an exemplary portable electronic computing device as housed therein.

As illustrated in FIG. 3, exemplary device 100 is shown with keyboard 108 extended away from display 109 having edge 109$a$. Device case 10 is shown to further include protrusions 40, detent keyboard grab 42, feature access 44, and feature access 46. Protrusions 40 assist in containing keyboard 108 when positioned adjacent display 109. Detent keyboard grab 42 provides finger access when keyboard 108 is being held by protrusions 40 to force to be applied to move keyboard 108 away from display 109. Display 109 is shown bordered by periphery 18 of outer case portion 12 wherein by outer case portion 12 and inner case portion 14 allows for visual access to display 109 by a user and provides recess sufficient to contain keyboard 108 when keyboard 18 is in retracted position wherein surface of periphery 18 of the outer case portion 12 is able to extend beyond both the inner case portion 14 and the exterior surface of the back of keyboard 102 as shown in FIG. 7.

Figure 4:
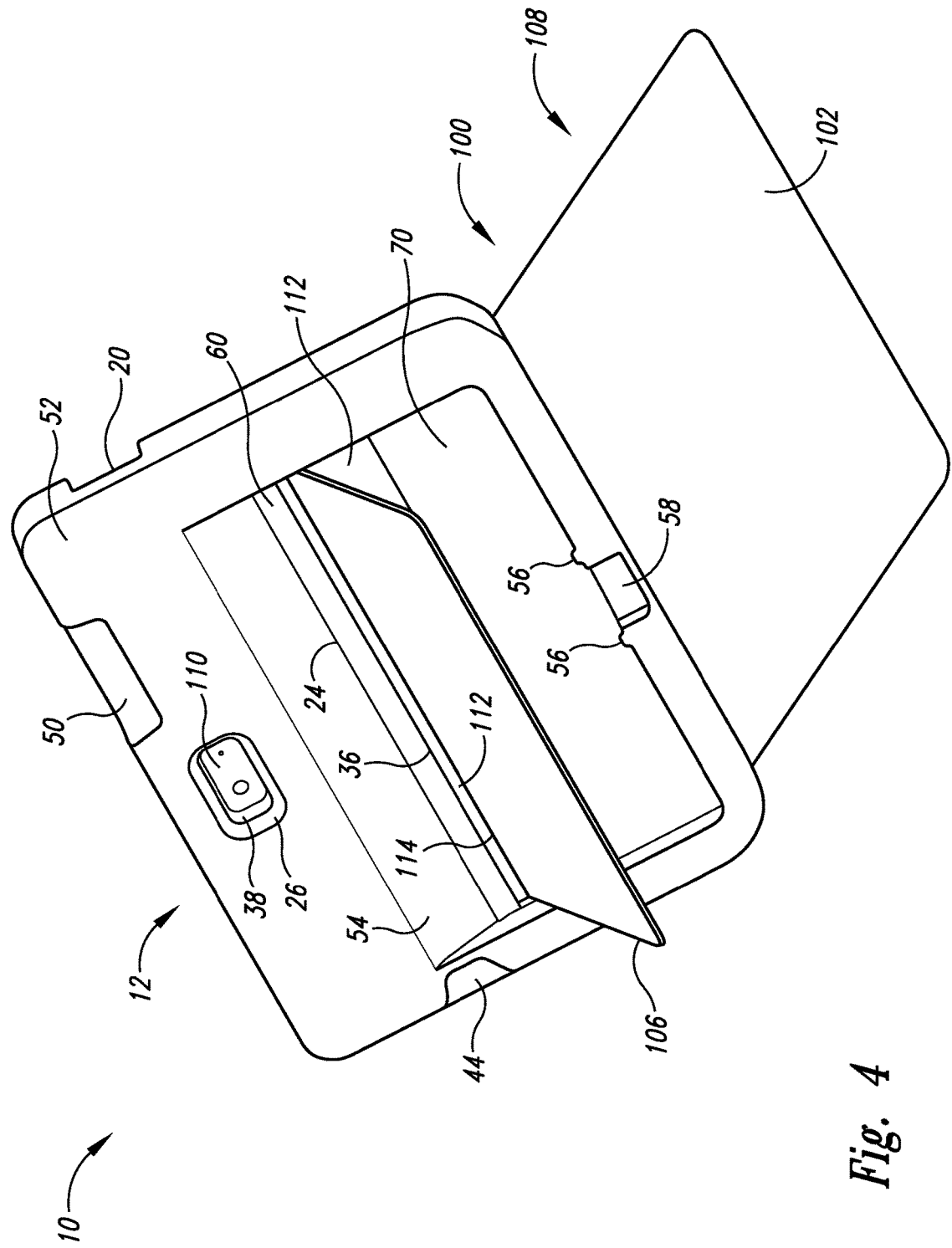
FIG. 4 is a rear perspective view of the case for portable electronic computing device embodiment of FIG. 1 showing an exemplary portable electronic computing device as housed therein.

Rear perspective view of FIG. 4 shows how stand apertures 24 and 36 allow stand 106 to extend beyond device case 10. Further shown, device case 10 includes feature access 50, back 52 of outer case portion 12, angled back portion 54 of outer case portion 12, protrusions 56, detent stand grab 58, and back 60 of inner case portion 14. Feature access 50 provides access to features of exemplary device 100 such as communication/data ports, etc. back 52 of outer case portion 12 can be of a softer shock absorbant material. Angled back portion 54 of outer case portion 12 is shaped and positioned to conform with stand 106 when stand 106 is positioned adjacent angled back portion 54. Also shown, exemplary device 100 includes camera 110, back 112 of display 109, and hinge 114, which allows stand 106 to be repositioned.

Figure 5:
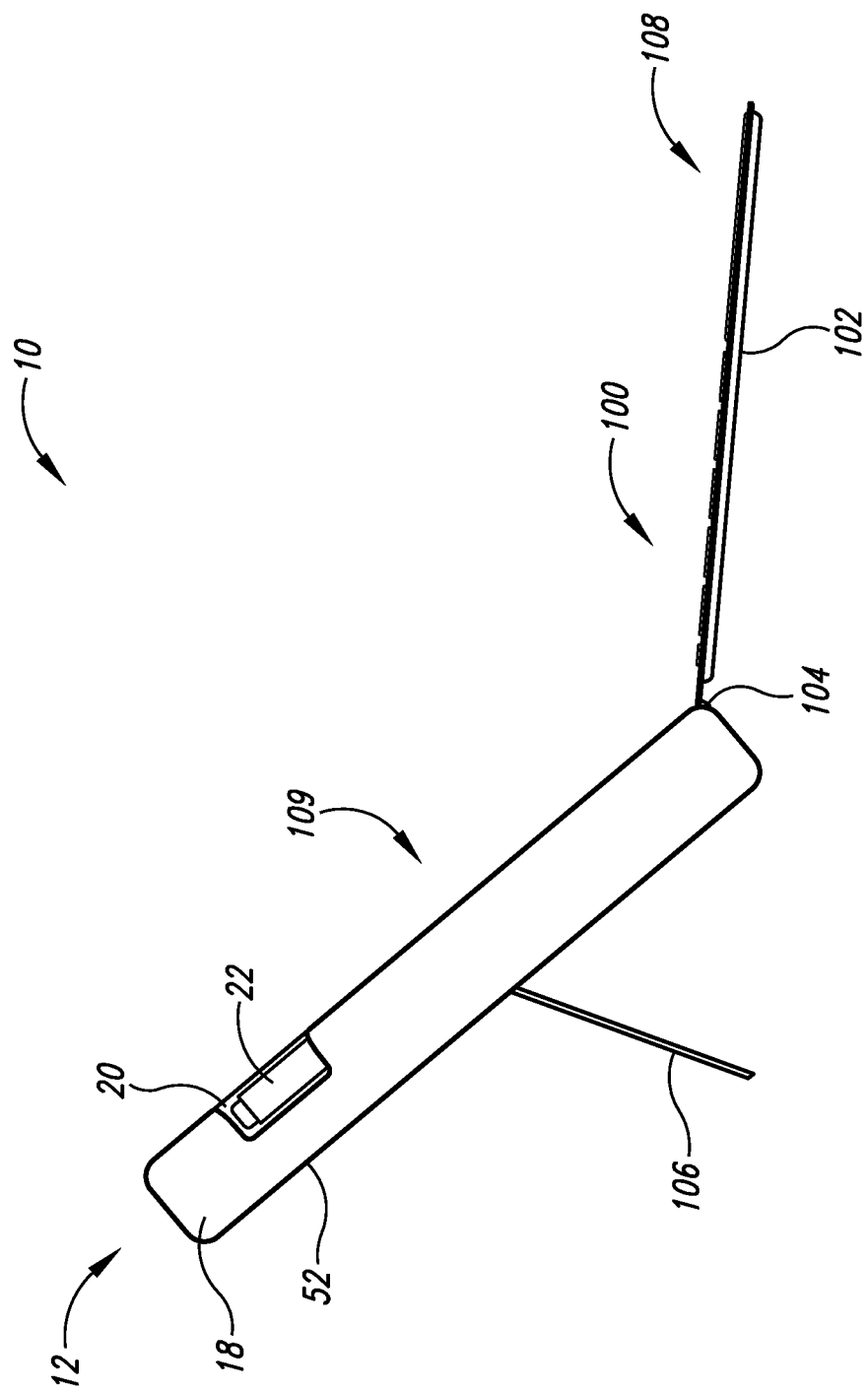
FIG. 5 is a side-elevational view of the case for portable electronic computing device embodiment of FIG. 1 showing an exemplary portable electronic computing device as housed therein.
Figure 8:
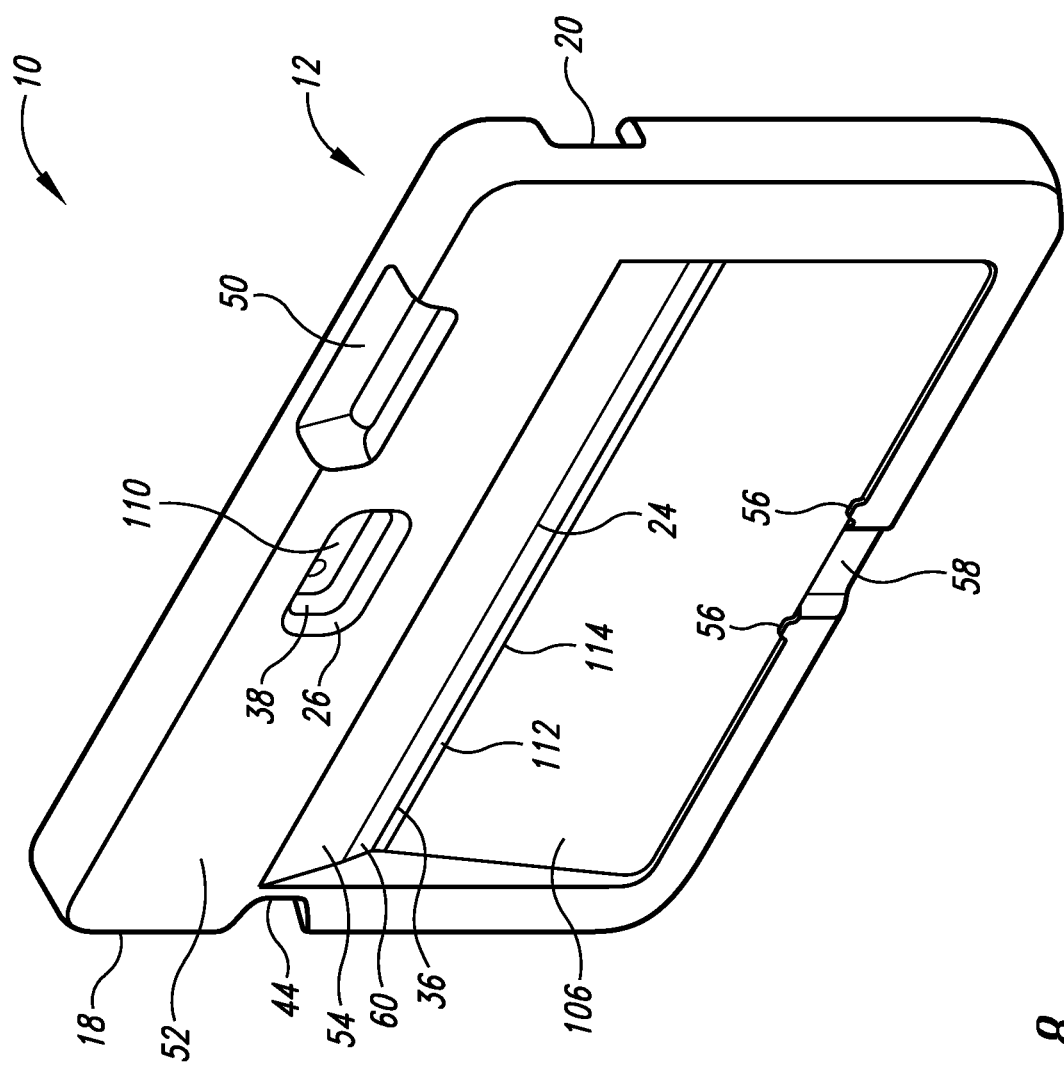
FIG. 8 is a rear perspective view of the case for portable electronic computing device embodiment of FIG. 1 showing an exemplary portable electronic computing device as housed therein.

Turning to FIG. 5, as shown in side-elevational view, exemplary device 100 is shown with stand 106 protruding through both stand aperture 24 of outer case portion 12 and stand aperture 36 of inner case portion 14 thereby protruding out rear of device case 10. Keyboard 108 is shown positioned away from display 109. In contrast, depicted in FIG. 6 is a side-elevational view of exemplary device 100 having both stand 106 and keyboard 108 in retracted position. FIG. 7 also shows keyboard 108 with back of keyboard 102 being shown in retracted position wherein protrusions 40 are being used, in part, to contain keyboard 108. FIG. 8 shows stand 106 in retracted position. FIG. 9 is a rear elevational view of exemplary device 100 being contained by device case 10. FIG. 10 depicts a side-elevational cross-sectional view of device case 10 containing exemplary device 100 taken along the cut lines 10-10 of FIG. 9 further showing, for instance, how outer case portion 12 and inner case portion 14 are coupled together. Orientations of angled back portion 54 of outer case portion 12 and angled back portion 70 of outer case portion 12 having angled orientations are shown to include stand 106 positioned adjacent angled back portion 70 while in retracted position of stand 106.

Inner case portion 14 can generally be made from first materials as polycarbonate materials or other hard materials such as other hard opaque plastic material. Outer case portion 12 can be made from such second materials as thermoplastic polyurethane, thermoplastic elastomer, silicone materials, or other soft material such as other soft plastic material, which provides shock absorption and surfaces for handling qualities. The harder first materials would provide more structural rigidity and the softer second materials would provide more shock impact characteristics and more surface texture to possibly aid its grip characteristics. Generally, first materials could have a hardness value greater than the hardness value of second materials. Hardness value is a material characteristic that is known to be generally expressed in terms of Shore A, Shore D, Rockwell, or other hardness measurement standards. Single molded processes can be used to form for instance outer case portion 12 from a single material or inner case portion from another single material. Other molding processes can be used to manufacture outer case portion 12 or inner case portion 14 as well.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A case for a computing device, the computing device including a stand movable between rectracted and extended positions, the case comprising:
    an inner case portion shaped and sized to contain the computing device, the the inner case portion including a first aperture sized, shaped, and positioned to allow the stand in its extended position to protrude therethrough as the computing device is contained by the inner case portion; and
    an outer case portion couplable with the inner case portion, the outer case portion including a second aperture sized, shaped, and positioned to allow the stand to protrude therethrough as the outer case portion is coupled to the inner case portion.

2. The case of claim 1 wherein the inner case portion has a first plurality of integrated fasteners and the outer case portion has a second plurality of integrated fasteners the first plurality of integrated fasteners individually coupled with the second plurality of integrated fasterners, the inner case portion being coupled with the outer case portion.

3. The case of claim 2 wherein the outer case portion includes a plurality of tabs and the inner case portion includes a plurality of slots, the plurality of tabs of the outer case portion individually aligned with the plurality of slots of the inner case portion, the inner case portion being coupled with the outer case portion.

4. The case of claim 2 wherein the outer case portion and the inner case portion couple together via in part a snap lock fit.

5. The case of claim 1 wherein the outer case includes one or more surfaces in angled orientation to be adjacent the stand in the stand's retracted position.

6. The case of claim 1 wherein the inner case portion being shaped to provide visual access by a user to a display of the computing device as the computing device is contained by the inner case portion.

7. The case of claim 6 wherein the outer case portion being shaped to provide visual access by a user to a display of the computing device as the computing device is contained by the inner case portion and the inner case portion is coupled to the outer case portion.

8. The case of claim 7 wherein the outer case portion includes a periphery with an outer surface, the outer case portion being shaped with the outer surface of the periphery being extended past the inner case portion as the inner case portion is coupled with the outer case portion, the outer surface of the periphery being extended past an exterior surface of the computing device as the computing device being contained by the inner case portion.

9. The case of claim 1 wherein the inner case portion includes polycarbonate material.

10. The case of claim 1 wherein the inner case portion includes a first material having a first hardness and the outer case portion includes a second material having a second hardness less than the first hardness in terms of Shore A, Shore D, or Rockwell measurement standards.

11. The case of claim 1 wherein one or more portions of the outer case portion are made from one or more thermoplastic polyurethane, thermoplastic elastomer, or silicone materials.

12. The case of claim 1 wherein the outer case portion includes protrusions shaped and positioned to couple with a keyboard of the computing device to contain the keyboard in a retracted position.

13. The case of claim 1 wherein the outer case portion includes protrusions shaped and positioned to couple with the stand of the computing device to contain the stand in a retracted position.

14. The case of claim 1 wherein the outer case portion includes a channel sized and shaped to contain a stylus.

15. A case for a computing device, the case comprising:
    an inner case portion including a rectangularly shaped tray with a back portion and one or more sides extending therefrom, the back portion including a first stand aperture; and
    an outer case portion couplable with the inner case portion, the outer case portion including a rectangularly shaped tray with a back portion, the back portion including a second stand aperture positioned to align with the first stand aperture of the inner case portion to provide a common aperture.

16. The case of claim 15 wherein the inner case portion has a first plurality of integrated fasteners and the outer case portion has a second plurality of integrated fasteners, the first plurality of integrated fasteners individually coupled with the second plurality of integrated fasterners, the inner case portion being coupled with the outer case portion.

17. The case of claim 16 wherein the outer case portion includes a plurality of tabs and the inner case portion includes a plurality of slots, the plurality of tabs of the outer case portion individually aligned with the plurality slots of the inner case portion, the inner case portion being coupled with the outer case portion.

18. The case of claim 15 wherein the inner case portion includes a first material having a first hardness and the outer case portion includes a second material having a second hardness less than the first hardness in terms of Shore A, Shore D, or Rockwell measurement standards.

19. The case of claim 15 wherein one or more portions of the inner case portion are made of polycarbonate material and one or more portions of the outer case portion are made from one or more thermoplastic polyurethane, thermoplastic elastomer, or silicone materials.

20. A case for a computing device, the case comprising:
an inner case portion including a first stand aperture; and
an outer case portion couplable with the inner case portion, the outer case portion including a second stand aperture positioned to align with the first stand aperture of the inner case portion to provide a common aperture.

* * * * *